United States Patent [19]

Formaini

[11] Patent Number: 4,526,606

[45] Date of Patent: Jul. 2, 1985

[54] UREA-FORMALDEHYDE LIQUID FERTILIZER SUSPENSION

[75] Inventor: Richard E. Formaini, Stone Mountain, Ga.

[73] Assignee: Georgia-Pacific Resins, Inc., Atlanta, Ga.

[21] Appl. No.: 491,988

[22] Filed: May 5, 1983

[51] Int. Cl.$^3$ ............................................. A01N 25/00
[52] U.S. Cl. ................................................ 71/3; 71/28; 564/32
[58] Field of Search ...................................... 71/28–30, 71/3; 564/32

[56] References Cited

U.S. PATENT DOCUMENTS

| | | | |
|---|---|---|---|
| 2,185,167 | 12/1939 | Hodgins et al. | 260/70 |
| 2,729,611 | 1/1956 | Chesley et al. | 260/29.4 |
| 2,766,283 | 10/1956 | Darden | 260/553 |
| 3,096,168 | 7/1963 | Waters et al. | 71/28 |
| 3,105,754 | 10/1963 | Marx | 71/30 |
| 3,183,073 | 5/1965 | Preston | 71/1 |
| 3,198,761 | 8/1965 | O'Donnell | 260/29.4 |
| 3,227,543 | 1/1966 | O'Donnell | 71/28 |
| 3,519,413 | 7/1970 | Trimbach et al. | 71/42 |
| 3,677,736 | 7/1972 | Formaini | 71/28 |
| 3,934,041 | 1/1976 | Snyder | 426/69 |
| 3,970,625 | 7/1976 | Moore et al. | 260/29.4 |
| 4,033,745 | 7/1977 | Moore | 71/28 |
| 4,089,899 | 5/1978 | Greidinger et al. | 260/553 R |
| 4,120,685 | 10/1978 | Vargiu et al. | 71/30 |
| 4,145,207 | 3/1979 | Moore | 71/29 |
| 4,298,512 | 11/1981 | Sartoretto et al. | 260/29.4 R |
| 4,336,052 | 6/1982 | Chen et al. | 71/28 |
| 4,409,015 | 10/1983 | Grace, Jr. | 71/28 |

*Primary Examiner*—Ferris H. Lander
*Attorney, Agent, or Firm*—Banner, Birch, McKie and Beckett

[57] ABSTRACT

A process for preparing a urea-formaldehyde condensate and fertilizer suspension wherein a water soluble sugar is used to control particle size in the suspension by inhibiting crosslinking. The process is capable of producing an essentially non-staining, fertilizer suspension that can be stabilized against settling by the addition of appropriate thickeners.

29 Claims, No Drawings

UREA-FORMALDEHYDE LIQUID FERTILIZER SUSPENSION

BACKGROUND OF THE INVENTION

1. Field of the Invention

The present invention broadly pertains to a urea-formaldehyde condensate suitable for producing a stable urea-formaldehyde liquid fertilizer suspension having a slowly releasable source of nitrogen. This invention also pertains to a process of preparing a fertilizer suspension from the urea-formaldehyde condensate. This invention particularly relates to a stepwise process for preparing the fertilizer suspension, which process optimally controls the polymerization reactions between urea and formaldehyde to yield a product ideally suited for use as fertilizer.

2. Description of Prior Art

Fertilizers based on polymerization products of urea and formaldehyde are well known. By providing a slow release of nitrogen, these fertilizers enhance plant growth while minimizing root and foliage damage, e.g., burning, caused by excessive amounts of readily available nitrogen. Urea-formaldehyde fertilizers are commercially available as both solids and liquid suspensions, and the numerous patents describing the preparation and use of such fertilizers are generally familiar to those skilled in the art. While initial development concentrated on the solid ureaform fertilizers, liquid fertilizers have generally become more popular because they can be handled more easily and can be more uniformly distributed at the point of use.

An early disclosure of a liquid fertilizer suspension based on urea and formaldehyde is Waters et al, U.S. Pat. No. 3,096,168. Waters reacts a molar excess of urea with formaldehyde in aqueous phosphoric acid, and terminates the reaction by the addition of an ammonia source. A stable suspension is reportedly obtained by violently agitating the resulting slurry. Unfortunately, the activity index of the fertilizer suspension produced by this procedure tends to be quite low.

Formaini U.S. Pat. No. 3,677,736 describes a process for preparing a urea-formaldehyde fertilizer suspension wherein a molar excess of urea is initially reacted under alkaline conditions with formaldehyde in the presence of ammonia, followed by acidification and further reaction at an elevated temperature. Upon neutralization, a fertilizer suspension is obtained. While the resulting product has a much improved activity index relative to Waters' product, the suspension typically lacks the desired storage stability needed for commercial use.

Moore, U.S. Pat. No. 4,033,745 prepares a stable non-burning liquid fertilizer suspension containing highly polymerized urea-formaldehyde by initially reacting a molar excess of urea with formaldehyde at an elevated temperature and under a strongly basic condition. The reaction mixture is thereafter cooled and slowly acidified under vigorous agitation. The ensuing polymerization exotherm raises the reaction mixture temperature to about 70° C., where it is then maintained until the mixture attains a desired consistency. The reaction is subsequently terminated by the addition of ammonia. At this point, other fertilizer nutrients, e.g., phosphorus and potassium; water-soluble sugar; and an aliphatic alcohol are added to the suspension with agitation to yield the final product. The alcohol reportedly helps improve the suspension's storability by inhibiting polymer growth, while the added sugar promotes microbial activity at the application site. Moore also indicates that the sugar helps to improve suspension stability. Since this procedure permits a high degree of polymerization, the activity index of the fertilizer product tends to be quite low.

Moore U.S. Pat. No. 4,145,207 describes an alternative procedure wherein an elevated temperature aqueous alkaline mixture of urea and formaldehyde is rapidly acidified with polyphosphoric acid. Rapid acidification reportedly initiates the formation of a large number of polymer chains. By thereafter carefully controlling the reaction mixture pH in accordance with the mixture's temperature rise, the polymer chains purportedly grow uniformly. With rapid cooling, a water-soluble sugar and an aliphatic alcohol are then added to the acidic mixture. Reaction between urea-formaldehyde polymers and added aliphatic alcohol reportedly reduce polymer growth and disproportionation during storage. The suspension is then stabilized using a gelled attapulgite clay.

Sartoretto U.S. Pat. No. 4,298,512 describes an acid catalyzed process for preparing a liquid fertilizer suspension wherein undesirable polymer growth is regulated by including a higher aldehyde, i.e., one having from 2 to 4 carbon atoms, in the initial urea and formaldehyde reaction mixture. The suspension produced is subsequently stabilized by the addition of a thickener-suspending agent, e.g., a vegetable gum such as xanthan gum.

Besides a controlled release of nitrogen and stability, another desirable property of liquid fertilizer suspensions, at least for certain commercial applications such as residential turf fertilization, is a low staining character. Staining refers to the tendency of dried fertilizer suspension particles to remain for protracted periods on a substrate, e.g., grass blades, driveways, sidewalks, etc. The dried suspension appears as a white deposit and homeowners generally find this deposit unsightly. It is known that staining is inversely related to particle size, i.e., smaller particles stain more than larger particles. Consequently, particle size considerations for a stable fertilizer suspension typically tend to conflict with those needed for a non-staining suspension.

It is an object of the present invention to provide a process for preparing a stable urea-formaldehyde condensate suitable for producing a urea-formaldehyde fertilizer suspension having a slowly releasable source of nitrogen.

It is also an object of the present invention to provide a process for preparing a urea-formaldehyde fertilizer from the condensate having a slowly releasable nitrogen source for enhancing plant growth.

It is another object of this invention to provide a process for preparing a stable, urea-formaldehyde liquid fertilizer suspension.

It is a further object of this invention to provide a process for producing a liquid fertilizer suspension having a relatively high activity index, i.e., above about 40.

It is still another object of this invention to provide a process for preparing a urea-formaldehyde fertilizer suspension which does not cause excessive foliage damage.

It is yet a further object of this invention to provide a process useful for producing a non-staining, stable urea-formaldehyde fertilizer suspension.

SUMMARY OF THE INVENTION

In accordance with the foregoing objectives and others which will be readily apparent to those skilled in this art, the present invention provides a process for preparing a urea-formaldehyde condensate suitable for producing a urea-formaldehyde fertilizer suspension having a slowly releasable source of nitrogen comprising the steps of:

(a) reacting urea, formaldehyde and a water-soluble sugar in an aqueous reaction medium having a urea to formaldehyde mol ratio in the range of about 0.35 to about 0.5, and having from about 0.15 to about equal parts by weight sugar for each part by weight of said formaldehyde, said reaction being conducted at a slightly alkaline pH under reflux conditions for a period of about 0.2 to about 2.0 hours; and (b) adjusting the reaction mixture of step (a) to an acidic pH and further reacting the mixture until a product with a viscosity within the range of about a Gardner A-J is obtained.

The present invention also provides a process for producing a urea-formaldehyde fertilizer suspension having a slowly releasable source of nitrogen comprising the steps of:

(a) reacting urea, formaldehyde and a water soluble sugar in an aqueous reaction medium having a urea to formaldehyde mol ratio in the range of about 0.35 to about 0.5 and having from about 0.15 to about equal parts by weight sugar for each part by weight of said formaldehyde, said reaction being conducted at a slightly alkaline pH under reflux conditions for a period of about 0.2 to about 2.0 hours;

(b) adjusting the reaction mixture of step (a) to an acidic pH and further reacting the mixture until a product with a viscosity within the range of about a Gardner A-J is obtained;

(c) adding sufficient urea to the product of (b) to give a cumulative urea to formaldehyde mol ratio in the range of about 1.8 to about 2.1 and adding sufficient formaldehyde to give a lower cumulative urea to formaldehyde mol ratio in the range of about 1.5 to about 1.9;

(d) reacting the product of (c) at an acidic pH and a temperature of about 45° to about 65° C. for a period of about 0.4 to about 3.0 hours;

(e) reacting the product of (d) at a less acidic pH than step (d) and at a temperature of between about 45° to about 65° C. for a period of about 0.4 to about 3.0 hours; and (f) cooling the mixture of (e) to about ambient temperature and adjusting the mixture to an alkaline pH.

Preferably, after adding sufficient urea to the product of step (b) above, to give a cumulative urea to formaldehyde mol ratio in the range of about 1.8 to about 2.1, the mixture is then reacted as required by step (d). Thereafter, sufficient formaldehyde is added to the product of step (d) to give a cumulative urea to formaldehyde mol ratio in the range of about 1.5 to about 1.9 and the mixture is then reacted as required by step (e). This preferred reaction sequence results in a fertilizer suspension having desirably low staining characteristics in addition to adequate stability.

DETAILED DESCRIPTION OF THE INVENTION

The present invention pertains to a process for preparing a urea-formaldehyde condensate particularly suitable for producing a fertilizer suspension as well as to a multi-step process for preparing a urea-formaldehyde liquid fertilizer suspension having a slowly releasable source of nitrogen from the condensate. The fertilizer suspension prepared according to this process typically contains above about 10% (by weight) total nitrogen, e.g., about 16 to about 20%, has a cold water insoluble nitrogen fraction (CWIN) of above about 2.5% (by weight), e.g., about 2.7 to about 4.6% and has an activity index of above about 40, e.g., between about 55 and about 90.

According to this invention, urea, formaldehyde and a source of water-soluble sugar are initially reacted in an aqueous, slightly alkaline medium at reflux. Any available source of urea can typically be employed. Generally, an inexpensive uncoated, pelleted grade of urea is preferred, either industrial or agricultural type is acceptable.

It is normally preferred to supply formaldehyde as a 50% (by weight) aqueous solution (formalin), although other sources of formaldehyde such as paraformaldehyde or a urea-formaldehyde concentrate, e.g., STA-FORM ®60 can also be used. STA-FORM ®60 is a commercially available liquid urea-formaldehyde reaction product equivalent to about 60% formaldehyde, 25% urea and 15% water. In the process of this invention, a 50% aqueous formaldehyde solution typically provides the best balance in terms of convenience, reactivity and cost. In the broad practice of this invention, part of the formaldehyde can be replaced with a higher aldehyde, e.g., acetaldehyde and/or propionaldehyde. As used in the specification and claims the term "formaldehyde" is also intended to embrace such mixtures of formaldehyde and higher aldehydes.

The final component in the initial reaction mixture, a water soluble sugar, plays an essential role in the formation of the desired product. Between about 0.15 to about equal parts by weight water soluble sugar is added to the reaction mixture for each part by weight of formaldehyde used in the initial mixture. Preferably, the water soluble sugar is used at a level of between about 0.25 and about 0.35, and most preferably about 0.3 parts by weight per part formaldehyde in order to yield a product with minimal staining characteristics.

As used herein, the term "water soluble sugar" is used in a generic sense to denote a wide variety of water soluble carbohydrates having aldehyde and hydroxyl functional groups. By reaction with formaldehyde, urea and methylol urea, the water soluble carbohydrate assists in controlling polymer growth (size) during preparation of the fertilizer suspension. While not wishing to be bound by any particular theory, applicant believes that reaction of the water soluble carbohydrate with monomeric and dimeric species, particularly formaldehyde and methylol urea which are abundant at this early reaction stage, inhibits further polymerization and hardening by limiting the number of reactive sites available for subsequent reactions, particularly urea-formaldehyde crosslinking reactions. In order to be useful in the present invention, the carbohydrate must be water soluble and must have the aldehyde and hydroxyl functional groups needed for participation in the desired reactions. A low-cost source of water-soluble carbohydrate particularly suitable for use in this invention is corn syrup. Other suitable sources of water-soluble carbohydrate include, for example, molasses, wood sugar and starch syrup. Generally, carbohydrate materials commonly referred to as sugars can be used in the practice of this invention. For convenience, all suitable carbohydrate materials will be referred to simply as water soluble sugar throughout the remaining specification and claims.

In order to promote the desired reaction between sugar and formaldehyde, the initial reaction mixture is formulated with a molar excess of formaldehyde relative to urea. Generally, the urea to formaldehyde mol ratio (U/F ratio) will be between about 0.35 and about 0.5 in the initial reaction mixture. Under the alkaline conditions existing in the initial reaction mixture, methylol ureas will also be formed; and these species will also react with sugar. Applicant has found that the reactions between sugar and both formaldehyde and methylol ureas promoted by initial refluxing of the recited mixture under a slightly alkaline condition are critically important for ultimately producing urea-formaldehyde polymers in the fertilizer suspension of the desired size and structure.

Sufficient alkaline material is added to the initial aqueous reaction mixture to establish a slightly alkaline pH preferably in the range of about 7.0 to about 8.0. Because of its low cost, sodium hydroxide is preferably used to adjust pH although other suitable alkaline materials, e.g., potassium hydroxide, ammonium hydroxide, organic amines such as monoethanol amine and triethanol amine, etc. will be apparent to those skilled in the art. The reaction mixture is then heated to reflux and thereafter refluxed for between about 0.2 to about 2.0 hours, preferably about 0.5 to about 1.5 hours, most preferably for about 1 hour.

In the board practice of this invention, reflux conditions can be established at above or below atmospheric pressure. Generally, however, the reaction mixture is refluxed at atmospheric pressure, since this is normally the most economical and establishes an appropriate temperature for promoting the desired reactions. As will be recognized by one skilled in this art, the reflux pressure and accordingly the temperature at which this reaction is conducted will to a certain extent influence the length of time the reaction is allowed to proceed.

The reaction mixture then generally is cooled to below about 90° C., preferably in the range of about 80° to about 90° C., and an acid is added to the mixture to establish an acidic pH preferably in the range of about 4.0 to about 5.5. In the broad practice of this invention the reaction mixture does not have to be cooled before acidification. Cooling is preferred, however, since it permits better control of the subsequent acid catalyzed urea-formaldehyde condensation reactions. For best results, sufficient acid is added to obtain a pH of about 5.0. A wide variety of mineral or organic acids can be successfully employed. For example, suitable acids include sulfuric, phosphoric, hydrochloric, formic, acetic and the like. Generally, considerations of cost and convenience will influence the acid used, e.g., formic acid may be preferred in many cases because of its low corrosiveness to certain types of stainless steel. This acid addition initiates a variety of acid catalyzed condensation reactions in the reaction mixture causing urea-formaldehyde polymer growth. Since these reactions are exothermic, cooling may be required to maintain the reaction mixture within the preferred temperature range of about 85° to about 95° C. At temperatures below about 80° C., the reaction kinetics are generally quite slow.

The acid catalyzed reactions are normally allowed to proceed until the reaction mixture exhibits a viscosity within the range of about a Gardner A-J. Preferably the reactions are continued until a viscosity equal to about a Gardner C is obtained. Depending upon the water content of the reaction mixture before this step, the final viscosity may be somewhat below or above this range. For example, if excess water is added to the to the reaction mixture, then the condensate may have a viscosity somewhat below a Gardner A. Alternatively, if the reaction mixtured is dehydrated prior to acid condensation, then the condensate may have a viscosity somewhat above a Gardner J. Generally, these acid catalyzed reactions are permitted to proceed for about 15 to 45 minutes, preferably for about 20 minutes.

At this point, the reaction mixture can be neutralized, e.g., by the addition of sodium hydroxide or other suitable alkaline material, to a pH preferably in the range of about 7.0 to 8.0, e.g., about 7.5. The urea-formaldehyde condensate so-formed is stable for over six months and conveniently can be stored for latter use. As will be described in more detail hereafter, this condensate can be used subsequently to produce a urea-formaldehyde fertilizer suspension having a slowly releasable source of nitrogen.

To produce a fertilizer suspension, urea is added initially to the urea-formaldehyde condensate. If the condensate is to be further reacted directly after its preparation, water is preferably added to cool the reaction mixture before the additional urea is added. An amount of urea sufficient to raise the U/F ratio (cumulative) to within the range of about 1.8 to about 2.1 is used. For example, if the initial reaction mixture used to prepare the condensate included 10 mols of formaldehyde and 4 mols urea for a U/F molar ratio of 0.4, between about 14 and about 17 mols of urea would be added in this step to yield the desired cumulative mol ratio. In the broad practice of this invention additional formaldehyde can also be added at this point to lower the cumulative urea to formaldehyde mol ratio to within the range of about 1.5 to about 1.9. Continuing the above example, between about 1.0 and about 4.0 mols of formaldehyde could be added as required to yield the desired cumulative ratio. Preferably, sufficient formaldehyde is added to give a cumulative U/F mol ratio in the range of about 1.5 to about 1.75. Preferably, the temperature of the reaction mixture is then adjusted, if necessary, to within the range of about 45° to about 65° C., most preferably about 50° C.

After any necessary temperature adjustment, a strong mineral acid, for example, sulfuric acid, is preferably added to the reaction mixture to re-initiate acid catalyzed polymerization reactions. In the broad practice of this invention any acid that can establish the desired pH in the reaction mixture can be successfully employed. Preferably, sufficient acid is added to reduce the pH to within the range of about 3.5 to about 4.5. As noted above, the acid catalyzed reactions are exothermic and cooling may be required to maintain the reaction mixture within the desired range, most preferably between about 49° to about 51° C. It is also desirable to carefully control the pH within the preferred range during this step. Most preferably a pH of about 4.2 is carefully maintained in order to produce a product with the most desirable characteristics. This is accomplished by carefully adding acid, e.g., sulfuric acid, or base, e.g., sodium hydroxide, as required. This reaction step is generally continued for a period of about 0.4 to about 3.0 hours, preferably about 1.5 hours. Longer reaction times generally are required at lower temperatures.

Afterwards, the pH of the reaction mixture is upwardly adjusted, preferably to a pH within the range of about 4.0 to 5.0, by the addition of alkaline material, for example, sodium hydroxide. Most preferably, the pH is adjusted to about 4.8. In order to improve the staining characteristics of the fertilizer suspension, the formaldehyde addition noted above is preferably postponed until this point in the process. As noted above, an amount of formaldehyde sufficient to raise the U/F cumulative mol ratio to within the range of about 1.5 to about 1.9 is used. The reaction mixture is then heated as required to between about 45° to about 65° C. and is preferably reacted for an additional one-half to two hours. In the broad practice of this invention, the mixture is reacted for a period of about 0.4 to about 3.0 hours, with longer times required at lower temperatures. During this stage, the pH is maintained within the preferred range generally by the addition of an acid, e.g., sulfuric acid, as required. In order to produce a product having the most desirable characteristics the pH is carefully controlled at a pH of about 4.8.

At this point, the preparation of the urea-formaldehyde polymerization product having a slowly releasable source of nitrogen is essentially complete. After cooling and proper neutralization to an alkaline pH, this suspension can be stored for prolonged periods provided that it is periodically agitated, e.g., once every two to three days. While periodic mild agitation is generally sufficient to resuspend the polymer product, the need for such periodic treatment in a commercial setting is inconvenient. In order to insure the stability of the suspension, a small quantity of a hydrophilic gum is preferably added to the reaction mixture. Applicant has found that a xanthan gum, e.g., Kelco's Kelzan ® provides the best stability, particularly when used in combination with guar gum. Other available stability-enhancing additives include, for example, carboxymethyl cellulose, alginates and attapulgite clay. Xanthan gum is generally added to the fertilizer suspension in the form of an alcohol-gum suspension. This facilitates handling and reduces the likelihood of water contamination which causes the gum to swell. Both methanol and propylene glycol are suitable dispersion media for the gum.

A small amount of additional urea is also generally added at this stage to provide a source of readily available nitrogen in the fertilizer. The amount added is determined by the desired product characteristics. A base, preferably ammonium hydroxide, is also added at this point to neutralize residual acid catalyst and scavenge any unreacted formaldehyde. This latter function enhances the stability of the suspension. A low-foaming surfactant is also optionally added. The surfactant aids in the dispersion of the fertilizer after application, by assisting the rewetting of dried water-insoluble material. In other words, the surfactant helps to mitigate any staining tendency of the fertilizer suspension. Suitable surfactants include Tween 40, a polyoxyethylene derivative of a fatty acid partial ester of sorbitol anhydride, and Triton X-114. These materials can be obtained from I.C.I. Americas Inc. and Rohm and Haas Company, respectively. To enhance the suspension stability, the pH of the suspension is generally adjusted to an alkaline pH, e.g., a pH between about 7.0 and about 8.0, with a base, e.g., sodium hydroxide.

At this point, other additives also may be mixed into the fertilizer suspension prior to use. For example, any of a wide variety of well-known inorganic fertilizer nutrients based on phosphorous and potassium may optionally be added. Additional urea may also be added. Pesticides may also be mixed into the suspension, e.g., to control weeds and kill insect larvae. Suitable additives are well within the skill of the art.

The following Examples are included for illustrative purposes only and are not intended to limit the scope of the invention.

EXAMPLE 1

This Example describes a preferred formulation and procedure for making a non-staining, storable urea-formaldehyde fertilizer suspension. First, about 169 parts corn syrup, 1109 parts aqueous 50% formaldehyde solution, 1.3 parts aqueous 50% sodium hydroxide solution and 453 parts urea were charged to a reactor which was equipped with a stirrer, heater, cooling coils and reflux condenser. Next, the mixture at a pH of about 7.5 was heated to reflux at atmospheric pressure, and was reacted at reflux for about 1 hour. The resulting solution at a pH of about 5.6 was cooled to 70° C., and about 0.6 parts aqueous 23% formic acid was added. Then, the solution at a pH of about 5.0 was heated to about 90° C. until the condensation product achieved a viscosity of about a Gardner "C". Upon proper neutralization, the resulting urea-formaldehyde condensate is stable for over six months.

At this point in order to produce a urea-formaldehyde fertilizer suspension, about 1534 parts water, 1653 parts urea, 28 parts ammonium thiosulfate and 6.4 parts 50% sulfuric acid were added, and the solution was reacted at about 50° C. and at a pH of about 4.2 for about 1.5 hours while 6.8 parts aqueous 50% sodium hydroxide solution were added as required to control the reaction pH. Next, 171 parts aqueous 50% formaldehyde solution and 12.9 parts 50% aqueous sodium hydroxide solution were added, and the suspension was reacted at about 60° C. and at a pH of about 4.8 for about 1 hour during which time about 3.2 parts 50% sulfuric acid were added as required to control the pH. Subsequently, about 321 parts water, 5.7 parts Kelzan S in 50.9 parts propylene glycol, 113 parts urea, 10 parts 28% aqua ammonia and 2 parts Tween 40 were added and the suspension was cooled to about 25° C. Finally, about 1.4 parts 50% aqueous sodium hydroxide solution were added to raise the suspension pH to about 8.5.

The resulting suspension contained about 18% nitrogen, about 2.4% cold water insoluble nitrogen and had an Activity Index of 87. The product remained fluid, uniform and pumpable for 4 months, and it did not cause residual staining of asphalt.

EXAMPLE 2

This Example illustrates the effect of using less urea, relative to formaldehyde, in the various reaction periods used to develop the water-insoluble nitrogen condensation products characteristic of the present invention than was used in the preferred method of Example 1.

First, about 1156 parts 50% formaldehyde, 176 parts corn syrup, 1.0 parts 50% sodium hydroxide and 472 parts urea were added to a stirred reaction flask equipped with a reflux condenser, and the mixture at a pH of about 7.5 was heated to atmospheric reflux (a temperature of about 103.5° C.). Then, the solution was held at reflux for about 45 minutes during which time the pH fell to about 6.1. After this, 0.4 parts 95% sulfuric acid was added to lower the pH to about 4.5, and the solution was reacted at about 85° C. until the viscosity had increased to about a Gardner "D". At this point, the reaction mixture, i.e., urea-formaldehyde condensate, can be neutralized if desired and stored for prolonged periods. In this example, a fertilizer suspension was produced directly by adding about 1608 parts urea, 1540 parts water and 0.6 parts 95% sulfuric acid to the solution which then was reacted at about 50° C. and a pH of about 4.2 for about 1.5 hours, while 0.8 parts 95% sulfuric acid was added to control the reaction pH as required. Following this, about 234 parts 50% formaldehyde and 2 parts 50% sodium hydroxide were added and the suspension was reacted at about 50° C. and pH 4.8 for 45 minutes while about 0.2 parts 95% sulfuric acid was added. Then, about 116 parts urea, 2 parts Kelzan S in 18 parts propylene glycol, 238 parts water, 20 parts Triton X-114 and 2 parts 50% sodium hydroxide were added. Finally, the suspension having a pH of about 7.7 was cooled to 25° C.

The resulting fertilizer suspension was found to contain about 18% N, 2.9 CWIN and had an AI of 83. The suspension, however, did not exhibit the exceptional long term stability of Example 1. Rather, absent periodic agitation, the suspension solidified about 1.5 months after preparation.

EXAMPLE 3

This Example shows the effect on staining of using less than the preferred quantity of corn syrup in the formulation of the initial reaction mixture.

First, about 56.7 parts water, 107.3 parts corn syrup, 1.7 parts aqueous 50% sodium hydroxide, 1077.4 parts aqueous 50% formaldehyde solution and 440 parts urea were added to a reaction flask equipped with a reflux condenser. The mixture, at a pH of about 7.4, was then heated to atmospheric reflux and held at reflux for about 45 minutes. Next, about 5.2 parts 23% formic acid were added to lower pH to about 5.0 and the solution was condensed to a gardner "C" viscosity. Then, about 1490.5 parts water, 1606.6 parts urea, 16.5 parts ammonium thiosulfate and 36.1 parts 23% formic acid were added and the solution was reacted at about 50° C. and pH 4.2 for 1.5 hours, while 12.1 parts aqueous 50% sodium hydroxide solution was added as required to control the reaction pH. As before, the urea-formaldehyde condensate recovered after the acid catalyzed condensation step could have been neutralized and stored for a prolonged period prior to the urea addition and subsequent reaction. Following the urea reaction step, about 166.1 parts 50% formaldehyde and 4.5 parts 50% sodium hydroxide were added and the suspension was held at about 60° C. and pH 4.8 for 1 hour while 6.1 parts 23% formic acid were added as required to control the reaction pH. Subsequently, about 5.5 parts Kelzan S in 12.1 parts methanol, 110 parts urea, 9.4 parts 28% aqua ammonia and 1.7 parts Tween 40 were added. Finally, the suspension was cooled to 25° C. and about 2.3 parts 50% aqueous sodium hydroxide solution was added to raise the pH to about 8.7.

The resulting fertilizer suspension contained about 18% N, 3.4% CWIN, and had an AI of 80. Although the mixture was stable for about 2 months, it was found to cause heavy residual staining of some objects.

EXAMPLE 4

This Example shows the effect on staining caused by adding the second formaldehyde charge ahead of the two reaction periods used to develop the water-insoluble nitrogen instead of between them as in the preferred method.

To a reaction vessel equipped with a reflux condenser was added about 163.9 parts corn syrup, 1077.4 parts 50% aqueous formaldehyde solution, 1.3 parts 50% aqueous sodium hydroxide solution and 440 parts urea. The mixture was heated to atmospheric reflux and held at reflux for 45 minutes during which time pH fell from about 7.2 to 6.0. Then, about 1.3 parts 23% formic acid was added, and subsequent acid condensation was allowed to proceed until a Gardner "C" viscosity was obtained. If desired, this condensate could be neutralized and stored at this time. In this example, about 1490.5 parts water, 1716.6 parts urea, 16.5 parts ammonium thiosulfate, 166.1 parts 50% aqueous formaldehyde solution and 32.8 parts 23% formic acid were added directly to the condensate. Then, the solution was reacted at about 50° C. and pH 4.2 for 1.5 hours, while 4.7 parts 50% aqueous sodium hydroxide solution was added. At this point, about 1.2 parts 50% sodium hydroxide was added and the suspension was reacted at about 60° C. and pH 4.8 for 30 minutes. Then, about 335.4 parts water, 3.9 parts Kelzan S in 34.4 parts propylene glycol, 9.4 parts 28% aqua ammonia and 1.7 parts Triton X-114 were added. The suspension was cooled to 25° C. and about 3 parts 50% sodium hydroxide was added to raise the pH to 8.3.

The fertilizer suspension was analyzed and found to contain about 18% N and 3.9% CWIN, and had an AI of about 59. The material was stable and pumpable for 3 months but it caused moderate residual staining of asphalt and other objects.

EXAMPLE 5

This Example demonstrates the effect of adding the water soluble sugar, e.g., corn syrup, after the precook step and subsequent to acidification for condensation.

About 1077.4 parts 50% formaldehyde, 1.6 parts 50% sodium hydroxide and 440 parts urea were placed in a glass reaction vessel that was equipped with a heater, thermometer, stirrer and reflux condenser. The mixture at pH of 7.2 was heated to atmospheric reflux and held at reflux for 15 minutes. Then, 1 part 23% formic acid was added to reduce the pH from 6.85 to 5.10 while the solution was cooled to 85° C. This step was followed by adding 175 parts corn syrup and by reheating the solution to 85° C. The solution was maintained at 85° C. until condensation occurred as indicated by the increase in the viscosity of the reaction mixture from a Gardner "AB" initially to a Gardner "C". At this point, about 1490.5 parts water, 1606.6 parts urea and 27.5 parts ammonium thiosulfate were added to the reaction flask. This reduced the temperature of the mixture to about 45° C. and it raised the pH to about 6.0. 10.9 parts 50% sulfuric acid were then added, and a reaction was carried out at about 50° C. and at a pH of about 4.2 for about 1.5 hours while an additional 8.0 parts 50% sulfuric acid were added as require to control the pH of the reaction mixture. Then, about 166.1 parts 50% formaldehyde and 3.8 parts 50% sodium hydroxide were added to the suspension, and the mixture was reacted at about 60° C. and at a pH of about 4.8 for 1 hour while about 0.6 parts 50% sulfuric acid was added to control the pH. Following this, about 312.4 parts water, 5.5 parts Kelzan S in 49.5 parts propylene glycol, 110 parts urea, 9.4 parts 28% aqua ammonia and 1.7 parts Tween 40 were added. The suspension was then cooled to 25°

C. and about 0.5 parts 50% sodium hydroxide was added to raise the mixture pH to about 8.4.

The resulting white suspension, when only 24 hours old, had a viscosity of 3900 cps which is unacceptably high. This indicates that very little condensation occurred between the corn syrup (water soluble sugar), and urea-formaldehyde monomer and dimer species making the resulting product unacceptably inferior to the product of this invention, particularly the preferred product of Example 1.

EXAMPLE 6

This Example shows the effect of altogether eliminating the water soluble sugar, e.g., corn syrup, and the precook step on the fertilizer suspension product's staining and stability characteristics.

About 1077.4 parts 50% formaldehyde, 440 parts urea and 1.1 parts 50% sodium hydroxide were weighed into a glass reaction vessel. The mixture at pH of about 5.05 was heated to about 85° C. to affect condensation as indicated by an increase in viscosity to a Gardner "C". Then, about 1507 parts water, 1606.6 parts urea and 6.3 parts 23% formic acid were added and the mixture was held at about 50° C. and at a pH of about 4.2 for 1 hour while an additional 1.1 parts 23% formic acid was added to control pH. About 2.7 parts 50% sodium hydroxide and 166.1 parts 50% formaldehyde were added, and the suspension was reacted at about 60° C. and at a pH of about 4.8 for 1 hour while about 5.4 parts 23% formic acid were added. Then, about 1.1 parts Guar Gum HP-8 and 3.85 parts Kelzan S in 34.65 parts propylene glycol, 110 parts urea, 9.4 parts 28% aqua ammonia and 1.7 parts Triton X-114 were added. The suspension, which had a pH of about 8.6, was then cooled to 25° C.

The resulting white suspension contained about 18% N and 4.4% CWIN and had an AI of 56. The suspension had a relatively short stability of less than about 1 month. In addition, it was found to cause moderate residual staining of asphalt and other objects.

Since modifications will be apparent to those skilled in the art, it is intended that the invention be limited only by the scope of the appended claims. For example, while specific examples of various reagents, e.g., acidic and alkaline materials, useful in practicing the present invention have been identified throughout the specification, these examples are for illustrative purposes only and a wide variety of materials can be substituted as equivalents as will be recognized by one skilled in the art.

I claim:

1. A process for preparing a urea-formaldehyde condensate suitable for producing a urea-formaldehyde fertilizer suspension having a slowly releasable source of nitrogen comprising the steps of:
   (a) reacting urea, formaldehyde and a water soluble sugar in an aqueous reaction medium having a urea to formaldehyde mol ratio in the range of about 0.35 to about 0.5 and having from about 0.15 to about equal parts by weight sugar for each part by weight of said formaldehyde, said reaction being conducted at a slightly alkaline pH under reflux conditions for a period of about 0.2 to about 2.0 hours; and
   (b) adjusting the reaction mixture of step (a) to an acidic pH and further reacting the mixture until a product with a viscosity within the range of about a Gardner A-J is obtained.

2. A process for producing a urea-formaldehyde fertilizer suspension having a slowly releasable source of nitrogen comprising the steps of:
   (a) reacting urea, formaldehyde and a water soluble sugar in an aqueous reaction medium having a urea to formaldehyde mol ratio in the range of about 0.35 to about 0.5 and having from about 0.15 to about equal parts by weight sugar for each part by weight of said formaldehyde, said reaction being conducted at a slightly alkaline pH under reflux conditions for a period of about 0.2 to about 2.0 hours;
   (b) adjusting the reaction mixture of step (a) to an acidic pH and further reacting the mixture until a product with a viscosity within the range of about a Gardner A-J is obtained;
   (c) adding sufficient urea to the product of (b) to give a cumulative urea to formaldehyde mol ratio in the range of about 1.8 to about 2.1 and adding sufficient formaldehyde to give a lower cumulative urea to formaldehyde mol ratio in the range of about 1.5 to about 1.9;
   (d) reacting the product of (c) at an acidic pH and a temperature of about 45° to about 65° C. for a period of about 0.4 to about 3.0 hours;
   (e) reacting the mixture at a less acidic pH than step (d) and at a temperature of about 45° to about 65° C. for a period of about 0.4 to about 3.0 hours; and
   (f) cooling the mixture of (e) to about ambient temperature and adjusting the mixture to a basic pH.

3. A process for producing a urea-formaldehyde fertilizer suspension having a slowly releasable source of nitrogen comprising the steps of:
   (a) reacting urea, formaldehyde and a water soluble sugar in an aqueous reaction medium having a urea to formaldehyde mol ratio in the range of about 0.35 to about 0.5 and having from about 0.15 to about equal parts by weight sugar for each part by weight of said formaldehyde, said reaction being conducted at a slightly alkaline pH under reflux conditions for a period of about 0.2 to about 2.0 hours;
   (b) adjusting the reaction mixture of step (a) to an acidic pH and further reacting the mixture until a product with a viscosity within the range of about a Gardner A-J is obtained;
   (c) adding sufficient urea to the product of (b) to give a cumulative urea to formaldehyde mol ratio in the range of about 1.8 to about 2.1;
   (d) reacting the product of (c) at an acidic pH and a temperature of about 45° to about 65° C. for a period of about 0.4 to about 3.0 hours;
   (e) adding sufficient formaldehyde to the product of (d) to give a lower cumulative urea to formaldehyde mol ratio in the range of about 1.5 to about 1.9 and reacting the mixture and a less acidic pH than step (d) and at a temperature of about 45° to about 65° C. for a period of about 0.4 to about 3.0 hours; and
   (f) cooling the mixture of (e) to about ambient temperature and adjusting the mixture to a basic pH.

4. The process of claims 2 or 3 wherein a thickening agent, sufficient urea to give a cumulative urea to formaldehyde mol ratio in the range of 1.5 to 1.9, and a surface active agent are added to the product of (e) prior to the cooling of the mixture in step (f).

5. The process of claims 2 or 3 wherein ammonium hydroxide is also added to the product of step (e).

6. The process of claim 4 wherein said thickening agent is a xanthan gum.

7. The process of claim 6 wherein said thickening agent also includes guar gum.

8. The process of claims 1, 2 or 3 wherein between about 0.25 and about 0.35 parts by weight water soluble sugar for each part by weight of said formaldehyde is included in the aqueous reaction medium of step (a).

9. The process of claims 1, 2 or 3 wherein the mixture of step (b) is reacted until a product with a viscosity of about a Gardner C is obtained.

10. The process of claims 2 or 3 wherein sufficient formaldehyde is added to give a cumulative urea to formaldehyde mol ratio in the range of about 1.5 to 1.75.

11. The process of claims 2 or 3 wherein the pH of step (d) is carefully controlled at about 4.2.

12. The process of claim 11 wherein the pH of step (e) is carefully controlled at about 4.8.

13. The product produced by the process of claim 1, said product having been adjusted to a pH in the range of about 7.0 to 8.0, whereby according to said process, water soluble sugar is initially incorporated in said condensate as reaction products of said sugar with formaldehyde and methylol urea.

14. The product produced by the process of claim 2, whereby according to said process, water soluble sugar is initially incorporated in said fertilizer suspension as reaction products of said sugar with formaldehyde and methylol urea.

15. The product produced by the process of claim 3, whereby according to said process, water soluble sugar is initially incorporated in said fertilizer suspension as reaction products of said sugar with formaldehyde and methylol urea.

16. The product produced by the process of claim 4, whereby according to said process, water soluble sugar is initially incorporated in said fertilizer suspension as reaction products of said sugar with formaldehyde and methylol urea.

17. The product produced by the process of claim 5, whereby according to said process, water soluble sugar is initially incorporated in said fertilizer suspension as reaction products of said sugar with formaldehyde and methylol urea.

18. The product produced by the process of claim 6, whereby according to said process, water soluble sugar is initially incorporated in said fertilizer suspension as reaction products of said sugar with formaldehyde and methylol urea.

19. The process of claims 1, 2 or 3 wherein the reaction mixture of (a) is cooled before adjusting it to an acidic pH.

20. The product of claim 14, also containing inorganic fertilizer nutrients.

21. The product of claim 14, also containing a pesticide.

22. The product of claim 15 also containing inorganic fertilizer nutrients.

23. The product of claim 16 also containing inorganic fertilizer nutrients.

24. The product of claim 17 also containing inorganic fertilizer nutrients.

25. The product of claim 18 also containing inorganic fertilizer nutrients.

26. The product of claim 15 also containing a pesticide.

27. The product of claim 16 also containing a pesticide.

28. The product of claim 17 also containing a pesticide.

29. The product of claim 18 also containing a pesticide.

* * * * *